Figure 1:
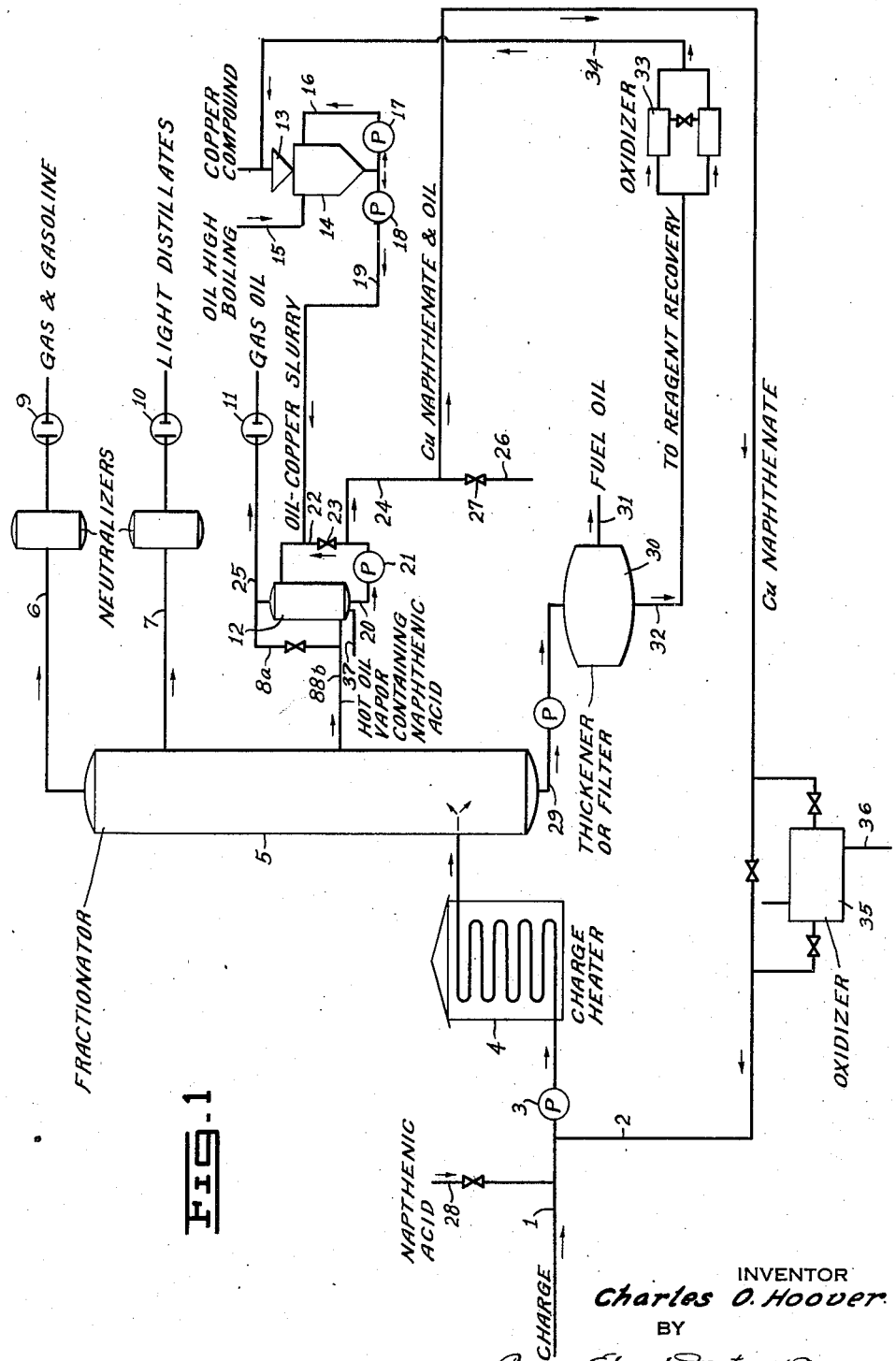

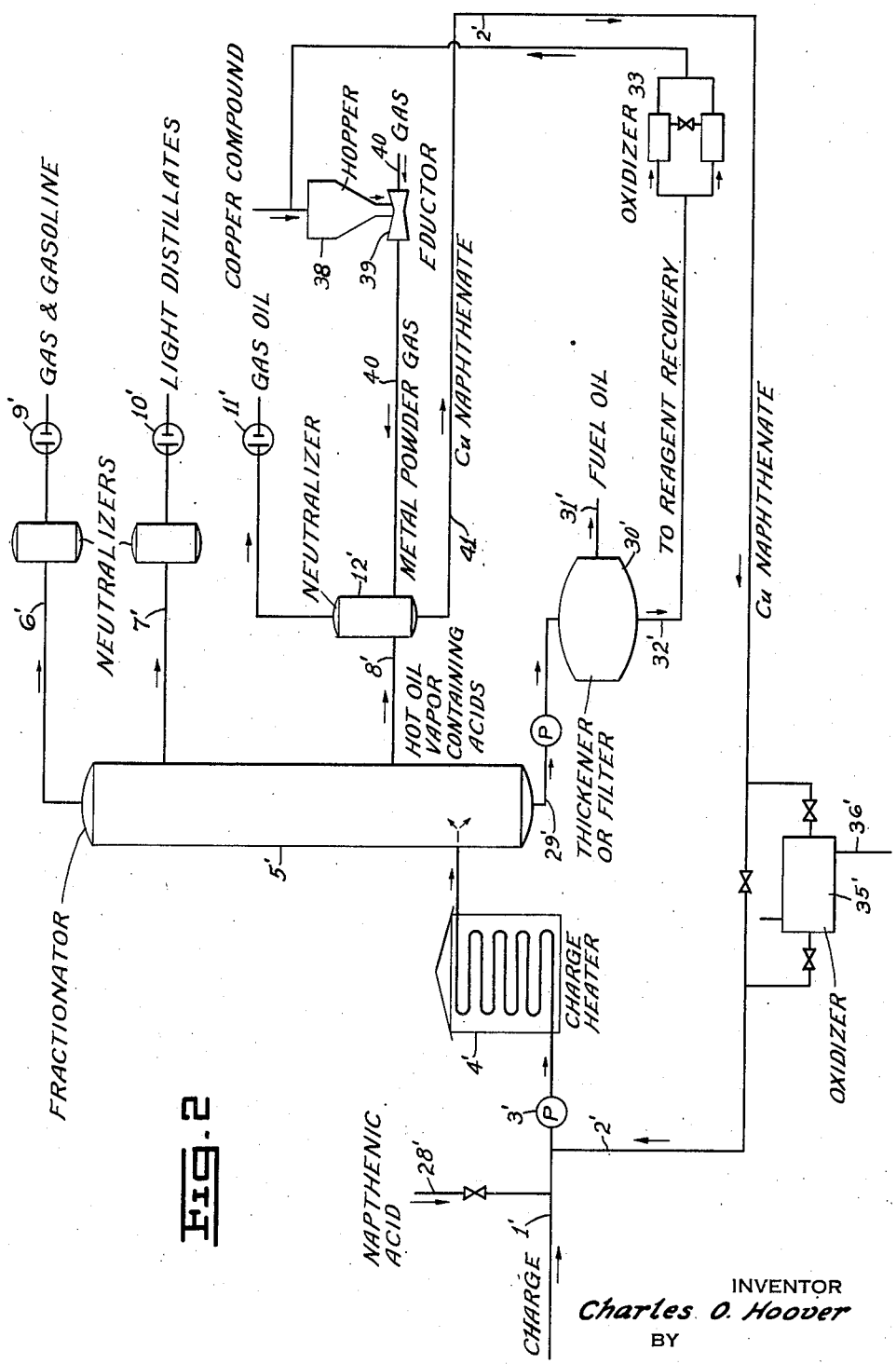

Patented June 7, 1949

2,472,253

UNITED STATES PATENT OFFICE 2,472,253

PRODUCTION OF CUPROUS NAPHTHENATE IN THE TREATMENT OF PETROLEUM OIL

Charles O. Hoover, Houston, Tex., assignor to Air Reduction Company, Incorporated, New York, N. Y., a corporation of New York Original application October 2, 1946, Serial No. 700,824. Divided and this application April 25, 1947, Serial No. 743,887

17 Claims. (Cl. 196—26)

1

This invention relates to the preparation of copper soaps or compounds of water-insoluble acids, and particularly to the preparation of cuprous naphthenate. While not so limited, the invention is particularly adapted to a process of producing cuprous naphthenate which may be used in a cyclic process for the treatment of crude petroleum oil, for fixing certain sulfur compounds present in the crude petroleum oil, to prevent formation of deleterious sulfur compounds in the products of distillation of the oil.

This application is a division of my application Ser. No. 700,824, filed October 2, 1946.

It is well known that most crude petroleum oils contain sulfur in the form of hydrogen sulfide or in more complex forms, the exact natures of which are not known. When such crudes are distilled reaction occurs which results in the formation of mercaptans and disulfides, which compounds generally are not found, as such in crude petroleum oils.

In my co-pending application Ser. No. 600,646, filed June 20, 1945, now Patent No. 2,467,429, I have disclosed a method for the treatment of crude petroleum oil to stabilize or otherwise modify sulfur compounds, other than hydrogen sulfide, which may be present so that upon subsequent distillation of the crude petroleum oil the sulfur compounds contained therein do not decompose or react to produce mercaptans, disulfides or other deleterious sulfur compounds in the distillates. In accordance with the method disclosed in that application, cupric naphthenate is added to and intimately mixed in relatively small amounts with the crude petroleum oil prior to its distillation or fractionation. The addition of cupric naphthenate to the crude petroleum oil stabilizes the sulfur compounds, other than hydrogen sulfide, contained therein so that upon subsequent distillation or fractionation of the crude petroleum oil they do not react or decompose to form mercaptans and disulfides.

In the process of my aforesaid application, the cupric naphthenate is decomposed during the heat treatment of the crude oil and yields naphthenic acid which passes off with the distillates. Also, any naphthenic acid which is present in the crude petroleum oil, as such, will carry through the distillation or fractionation chamber and passes off with the distillates.

The present invention contemplates a process of producing a copper soap, such as cuprous naphthenate, in which a finely-divided copper compound suspended in a fluid medium is caused to react with vapors of a water-insoluble organic

2 acid. The vapors of the water-insoluble organic acid may be concentrated, as when obtained by vaporization of the acid from the liquid phase, or they may be diluted with inert materials, as in the case of gas-oil vapors containing naphthenic or other water-insoluble organic acid vapors resulting from decomposition of a copper naphthenate or other copper soap used in the treatment of the crude oil from which the gas-oil vapors are obtained. Examples of copper compounds which may be used for reaction with the naphthenic or other water-insoluble acid vapors are cuprous oxide, cupric oxide, cuprous hydroxide, cupric hydroxide, cupric carbonate, and cupric acetate. Metallic copper also may be used if sufficient oxygen is present to first convert the metallic copper to copper oxide, in which form it is much more reactive than in the metallic form. The fluid medium in which the copper compound, which term is used herein to include metallic copper as well as compounds of the general type of those referred to above, is suspended may be an oil having a high boiling point, such as high-boiling lubricating oils, or any gas or vapor which is inert with respect to the organic acid and to any oil vapors which may be present during the reaction, such as still gases, nitrogen, carbon dioxide, or even gas-oil vapors containing naphthenic or other water-insoluble organic acid vapors with which the copper compound is to react.

The formation of cuprous naphthenate from naphthenic acid, or other water-insoluble organic acids, is based on the discovery that cupric naphthenate when heated to 225° C. or thereabouts, is converted substantially completely to cuprous naphthenate. Therefore, if the reaction is carried out at an elevated temperature above about that just indicated, cuprous naphthenate will be formed.

The invention is particularly adapted for use as a part of a cyclic process for the treatment of crude petroleum oils with a copper naphthenate, although it may be used for the production of cuprous naphthenate or other cuprous soap to be used, as such, or when oxidized to the cupric state, as a paint dryer or for other purposes. When used as a part of a cyclic process for the treatment of crude petroleum oils for the fixation of sulfur compounds contained therein, the copper compound in fluid suspension will be brought into intimate contact at a temperature above about 225° C. with the gas-oil vapors containing the naphthenic or other water-insoluble organic acid vapors, with resultant formation of cuprous naphthenate or other cuprous soap, which, having a higher boiling point than that prevailing in the reaction chamber settles to the bottom and is withdrawn. The withdrawn cuprous soap, as such or after being subjected to oxidation to convert it to the cupric state is returned for treatment of further amounts of crude oil.

For a further and more complete understanding of the invention, reference is made to the accompanying drawings in which:

Fig. 1 is a flow sheet illustrating one method in which the process of the present invention may be carried out in a cyclic manner in connection with the treatment of crude petroleum oil with a copper soap, and Fig. 2 is a flow sheet of a slightly modified arrangement.

Referring first to Fig. 1, a charge of crude petroleum oil passing through a conduit 1, together with a small amount of a copper soap, for example cupric naphthenate, introduced through a conduit 2, is pumped by a pump 3 through a charge heater 4 where the temperature of the crude petroleum oil is raised to its flashing point, for example about 750° F. The thus heated crude oil, together with the copper naphthenate contained therein, is then introduced into the lower portion of a fractionation column 5, whereupon the petroleum oil flashes, forming a vapor phase consisting of distillates and naphthenic acid resulting from decomposition of the copper naphthenate, and a liquid phase consisting of fuel oil which carries the copper product of the decomposition of the copper naphthenate. The copper product and the fuel oil settle to the bottom of the column.

The vapor resulting from the flashing of the hot charge of crude oil in the fractionation column 5 may be fractionated into as many fractions as desired. As shown in Fig. 1, it is divided into a light gas and gasoline fraction which is withdrawn from the top of the fractionation column 5 through a conduit 6, a heavier fraction of light distillates which is withdrawn at a lower level from the column through a conduit 7, and a still heavier fraction consisting essentially of gas oil which is withdrawn from a still lower portion of the column, through a conduit 8. The fractions withdrawn through the conduits 6, 7, and 8 will contain varying amounts of the naphthenic acid resulting from the decomposition of the copper naphthenate, and, if the crude oil is of the naphthene-base type, from the presence of naphthenic acid present, as such, in the original crude oil. However, most of the naphthenic acid will be contained in the gas-oil fraction withdrawn through the conduit 8. The fractions withdrawn through the conduits 6, 7 and 8 may be passed through condensers 9, 10 and 11, in accordance with the usual practice.

In accordance with the present invention, any one or all of the fractions withdrawn through the conduits 6, 7 and 8 may be treated with a fluid suspension of a finely-divided copper compound such as those referred to above, provided, that if the copper compound is metallic copper, sufficient oxygen must be introduced to convert the metallic copper to copper oxide.

As shown in Fig. 1, the oil fraction withdrawn through the conduit 8, which contains a relatively large percentage of naphthenic acid resulting from decomposition of the copper naphthenate used in the treatment of the oil is passed through a neutralizer 12 where it is caused to react with one or more of the copper compounds referred to above, or copper oxide resulting from the oxidation of finely divided metallic copper supplied in the form of an oil suspension or slurry. The copper compound is supplied from a hopper 13 to a mixing drum 14 where it is intimately mixed with an oil having a boiling point slightly higher than the temperature of the oil vapors passing into the neutralizer 12, so that when subjected to the temperature prevailing in the neutralizer 12 it will not be vaporized and pass from the neutralizer with the hot oil vapors. Ordinarily, an oil having a boiling point of 800° F. or higher is satisfactory, as the temperature in the neutralizer will not exceed about 750° F.

In order to obtain intimate mixing and suspension of the copper compound with the oil in the mixing drum 14, a portion of the oil and copper compound may constantly be withdrawn from the bottom of the mixing drum and circulated back to the top thereof through a conduit 16 by means of a suitable circulating pump 17.

The suspension or slurry of finely-divided copper compound in the oil is withdrawn from the mixing drum 14 by a pump 18 and passed through a conduit 19 and introduced therefrom into an upper portion of the neutralizer 12. The neutralizer 12 is maintained substantially filled with baffles, chains or some other inert material which will cause a large surface contact between the oil-copper-compound slurry and the hot oil vapors containing the naphthenic acid. As the hot gas oil vapors and the naphthenic acid rise in the neutralizer 12 countercurrent to the downwardly flowing oil-copper-compound slurry or suspension the naphthenic acid contained in them comes into intimate contact with the finely-divided copper compound of the oil-copper-compound slurry, with resulting formation of copper naphthenate. The copper naphthenate immediately dissolves in the carrier oil slurry and is temporarily retained in the neutralizer 12 due to the fact that it has a higher boiling point than the gas oil vapors passing through the neutralizer. The pressure in the neutralizer 12 is not important; it may be that prevailing in columns where gas oil vapors are fractionated.

In order to obtain complete reaction between the copper compound of the oil-copper-compound slurry and the naphthenic acid contained in the hot gas-oil vapors, the oil-copper-compound slurry containing dissolved copper naphthenate formed by reaction of the copper compound with naphthenic acid constantly is withdrawn from the bottom of the neutralizer 12 through a conduit 20 and is pumped by means of a pump 21 through a conduit 22 back to the upper portion of the neutralizer. The conduit 22 is provided with a valve 23 which normally is so adjusted that a relatively small proportion of the oil containing the copper naphthenate in solution constantly is withdrawn through a conduit 24. The gas oil freed of the naphthenic acid, but containing vapors of any vaporizable substance formed as a result of the reaction between the copper compound and the naphthenic acid in the neutralizer 12 is withdrawn from the top of the neutralizer through a conduit 25 leading to the condenser 11. The steam or any other vaporized products of the reaction between the copper compound and the naphthenic acid may be separated from the hot oil vapors in the condenser 11, or otherwise by means well known in the industry.

The cupric naphthenate dissolved in the oil withdrawn through the conduit 24 is cycled back through the conduit 2 and used for the treatment of further amounts of crude petroleum in the manner more particularly described in my aforesaid application.

If the particular crude petroleum which is being treated is of the naphthene-base type and contains a relatively high proportion of naphthenic acid, the amount of cuprous naphthenate formed in the neutralizer 12 may be more than is necessary for re-use in the system. In such case, any such excess of cuprous naphthenate may be withdrawn through a bleed conduit 26 controlled by a valve 27; or the excess naphthenic acid may be permitted to remain in the distillate, reacting only sufficient of the naphthenic acid with the copper compound to form the required amount of cuprous naphthenate for subsequent re-use in the treatment of further amounts of crude oil. That may be done by restricting the amount of copper compound in the oil-copper slurry available for reaction with the naphthenic acid in the neutralizer 12, or by by-passing a portion of the hot gas oil vapors through a conduit 8a controlled by a valve 8b. On the other hand, should the amount of naphthenic acid contained in the crude petroleum be insufficient to compensate for that lost by removal with lighter fractions not treated for the recovery of the naphthenic acid content thereof, such additional amount of naphthenic acid as may be necessary to produce sufficient cuprous naphthenate for fixing the sulfur compounds in the crude oil may be introduced through a conduit 28.

The copper product and the fuel oil may be withdrawn from the bottom of the fractionation column 5 through a conduit 29 and passed to a suitable thickener or filter 30 where the copper product is separated from the fuel oil. The fuel oil may be withdrawn through a conduit 31 while the copper product is withdrawn through a conduit 32 and suitably treated for regeneration to the copper compound to be introduced into the oil suspension to the neutralizer 12 to react with the naphthenic acid therein. For example, the copper product may be passed into an oxidizer 33 where it is converted to the oxide, and the resulting oxide passed through a conduit 34 to the hopper 13. If it is desired to use a copper compound other than the oxide for reaction with the naphthenic acid in the neutralizer 12, the copper product passing from the thickener or filter 30 may be treated in any other conventional manner to convert it to the desired compound.

In case it should be desired to treat the crude oil with cupric naphthenate instead of cuprous naphthenate for the purpose of fixing the sulfur compounds contained therein, the oil solution of cuprous naphthenate being recycled may be by-passed through an oxidizer 35 suitable pipes and valve connections being provided for the purpose. Oxygen or an oxygen-carrying gas may be introduced through a pipe 36 for passing through the oil solution of cuprous naphthenate in the oxidizer 35 for the oxidation of the cuprous naphthenate to cupric naphthenate.

In Fig. 1 only the gas-oil fraction withdrawn from the lower portion of the fractionation column 5 is treated for recovery of the naphthenic acid and its conversion to cuprous naphthenate. However, if desired, the fractions withdrawn through the conduits 6 and 7 also could be passed through neutralizers similar to the neutralizer 12 for the conversion of the naphthenic acid content thereof to cuprous naphthenate, such neutralizers being indicated in dotted lines at 12a and 12b, respectively.

If the oil-copper-compound suspension or slurry contains finely-divided metallic copper, it is desirable that air or other suitable supply of gaseous oxygen be introduced into the neutralizer 12 so that the metallic copper carried in the suspension of slurry first may be oxidized to copper oxide in which form the copper is more reactive with the naphthenic acid contained in the gas-oil vapors. Air for that purpose may be introduced into the neutralizer 12 through a conduit 37.

If the invention is carried out as just described, that is, by the introduction of metallic copper into the neutralizer 12 and its subsequent oxidation to copper oxide by air or other oxygen-carrying gas supplied through the conduit 37, the copper naphthenate formed by reaction between the copper oxide and naphthenic acid contained in the gas oil vapors will be in the cuprous state, as cuprous naphthenate exists at the temperature prevailing in the neutralizer 12, even should there be an excess of oxygen present.

In Fig. 2, there is disclosed a modified form of the invention which is similar to that disclosed in Fig. 1 in all respects except that the copper compound instead of being suspended in a high-boiling oil and introduced into the neutralizer 12' in the form of an oil-copper-compound slurry, is suspended in a gas and introduced in a gaseous stream into a lower portion of the neutralizer 12'. Referring to that figure, the copper compound, which like the copper compound referred to in connection with the previous form of the invention, may be cupric oxide, cuprous oxide, cupric hydroxide, cuprous hydroxide, cupric carbonate, cupric acetate or finely-divided metallic copper or other compounds thereof, is introduced from a hopper 38 into an eductor 39 where it is picked up and suspended in a suitable gaseous medium introduced through a conduit 40. If the copper compound is finely-divided metallic copper, the gas passing through the conduit 40 for suspending the finely-divided copper should contain a sufficient amount of oxygen to oxidize the metallic copper to copper oxide before it reacts with the naphthenic acid contained in the gas oil vapors, as described above. In order to avoid possible oxidation of hydrocarbon vapors, I prefer that the amount of oxygen so introduced into the neutralizer not be in excess of that needed for oxidation of the metallic copper to copper oxide. If the copper supplied from the hopper 38 is in the form of a copper compound, such as those referred to above, the nature of the gas passing through the conduit 40 for suspension of the finely-divided compound is immaterial, as long as it is inert with respect to the gas oil vapors and naphthenic acid passing through the neutralizer 12'. It may be air, any inert gas, or still gas; or it may be a portion of the gas oil vapors by-passed from the charge beater 4.

The finely-divided copper compound suspended in the gaseous medium in the eductor 39 is passed through the conduit 40 into the lower portion of the neutralizer 12' and passes therethrough concurrently with the hot gas oil vapors containing the naphthenic acid introduced through the conduit 8'. As the hot oil vapors containing the naphthenic acid and the gaseous or vaporous suspension of the finely-divided copper compound passes upwardly through the neutralizer 12' the copper compound reacts with the naphthenic acid contained in the hot oil vapors with resultant formation of cuprous naphthenate, which being a liquid having a boiling point higher than the temperature prevailing in the neutralizer 12′ settles to the bottom of the neutralizer and may be withdrawn through the conduit 41 and recycled back to the conduit 2′ for use in the fixation of sulfur compounds in further amounts of crude oil. In all other respects the process represented by the flow sheet of Fig. 2 is identical with that described above in connection with the flow sheet of Fig. 1, and like reference characters, primed, have been used to designate like parts of the apparatus.

From the foregoing it will be apparent that the present invention provides a process for converting naphthenic acid to cuprous naphthenate, and to a process which particularly is adapted to form a part of a cyclic process for the treatment of crude petroleum oil with cuprous or cupric naphthenate, in which naphthenic acid liberated as a result of the treatment of the oil with the cuprous or cupric naphthenate is recovered and used in the reformation of cuprous naphthenate, which, if desired, may be oxidized to cupric naphthenate for the treatment of further amounts of crude oil. When used in connection with a process for fixing sulfur compounds obtained in crude petroleum oil it has the further advantage of improving the quality of the distillates which are recovered due to the fact that the naphthenic acid and other organic acids which are present in the distillates are removed.

While the invention has been particularly described in connection with the production of cuprous naphthenate from naphthenic acid, it is to be understood that the process is equally applicable for the production of other cuprous compounds of water-insoluble organic acids such as cuprous compounds of oleic, stearic, tall-oil, linoleic, and resin acids. Thus, if cuprous or cupric tallate, for example, were used for the fixation of sulfur compounds in the crude petroleum oil, tall-oil acid would result from the decomposition of the cuprous or cupric tallate in the fractionation column which could be reacted with the finely-divided copper compound to form cuprous tallate, which subsequently could be used as such, or oxidized to cupric tallate, in the manner described above for the treatment of further amounts of crude oil.

While the charging stock introduced through the conduit 1 has been referred to as crude petroleum oil, it is to be understood that it might be any other stock which it is desired to treat with a copper naphthenate for the fixation of sulfur compounds contained therein.

It also will be understood that while the petroleum vapors containing the water-insoluble organic acid are brought into intimate contact with the copper compound after at least partial fractionation of the vapors, if desired, the heated stock containing the copper soap first could be introduced into a flash drum, and all of the vapors therefrom and the water-insoluble organic acid carried thereby brought into intimate contact with the copper compound and the oil vapors, stripped of the acid vapors, thereafter fractionated, as described in my co-pending application, Serial No. 700,823 filed October 2, 1946.

Various changes may be made in the procedure without departing from the invention or sacrificing any of the advantages thereof.

I claim:

1. In the process of treating petroleum oil with a copper soap of a water-insoluble organic acid for the fixation of sulfur compounds contained therein in which the copper soap is introduced into the oil and the oil subsequently is subjected to heat treatment with the liberation of vapors containing the organic acid resulting from decomposition of the copper soap; the improvement which comprises passing the liberated vapors containing the organic acid into intimate contact with a finely-divided copper compound suspended in a fluid medium which is inert with respect to the oil vapors and the organic acid, with resultant formation of the cuprous soap of the acid, and using the thus formed cuprous soap as the source material of the copper soap used in the treatment of further amounts of oil.

2. In the process of treating petroleum oil with a copper soap of a water-insoluble organic acid for the fixation of sulfur compounds contained therein in which the copper soap is introduced into the oil and the oil subsequently is subjected to heat treatment with the liberation of vapors containing the organic acid resulting from decomposition of the copper soap, the improvement which comprises passing the liberated vapors containing the organic acid into intimate contact with a finely-divided copper compound suspended in a high-boiling oil which is inert with respect to the oil vapors and the organic acid, with resultant formation of the cuprous soap of the acid, and using the thus formed cuprous soap as the source material of the copper soap used in the treatment of further amounts of oil.

3. In the process of treating petroleum oil with a copper soap of a water-insoluble organic acid for the fixation of sulfur compounds contained therein in which the copper soap is introduced into the oil and the oil subsequently is subjected to heat treatment with the liberation of vapors containing the organic acid resulting from decomposition of the copper soap; the improvement which comprises passing the liberated vapors containing the organic acid into intimate contact with a finely-divided copper compound suspended in a gaseous medium which is inert with respect to the oil vapors and the organic acid, with resultant formation of the cuprous soap of the acid, and using the thus formed cuprous soap as the source material of the copper soap used in the treatment of further amounts of oil.

4. In the process of treating petroleum oil with a copper soap of a water-insoluble organic acid for the fixation of sulfur compounds contained therein in which the copper soap is introduced into the oil and the oil subsequently is subjected to heat treatment with the liberation of vapors containing the organic acid resulting from decomposition of the copper soap; the improvement which comprises passing the liberated vapors containing the organic acid into intimate contact with a finely-divided copper compound suspended in a fluid medium which is inert with respect to the oil vapors and the organic acid, at a temperature above about 225° C., with resultant formation of the cuprous soap of the acid, and using the thus formed cuprous soap as the source material of the copper soap used in the treatment of further amounts of oil.

5. In the process of treating petroleum oil with a copper soap of a water-insoluble organic acid for the fixation of sulfur compounds contained therein in which the copper soap is introduced into the oil and the oil subsequently is subjected to heat treatment with the liberation of vapors containing the organic acid resulting from decomposition of the copper soap; the improvement which comprises passing the liberated vapors containing the organic acid in vaporous form into intimate contact with a finely-divided copper compound suspended in a fluid medium which is inert with respect to the oil vapors and the organic acid, with resultant formation of the cuprous soap of the acid, and using the thus formed cuprous soap as the source material of the copper soap used in the treatment of further amounts of oil.

6. In the process of treating petroleum oil with a copper naphthenate for the fixation of sulfur compounds contained therein in which the copper naphthenate is introduced into the oil and the oil subsequently is subjected to heat treatment and the liberation of vapors containing naphthenic acid resulting from the decomposition of the copper naphthenate; the improvement which comprises passing liberated vapors containing the naphthenic acid into intimate contact with a finely-divided copper compound suspended in a fluid medium which is inert with respect to the oil vapors and the naphthenic acid, with resultant formation of cuprous naphthenate, and using the cuprous naphthenate thus formed as the source material of the copper naphthenate used in the treatment of further amounts of oil.

7. In the process of treating petroleum oil with a copper naphthenate for the fixation of sulfur compounds contained therein in which the copper naphthenate is introduced into the oil and the oil subsequently is subjected to heat treatment and the liberation of vapors containing naphthenic acid resulting from the decomposition of the copper naphthenate; the improvement which comprises passing liberated vapors containing the naphthenic acid into intimate contact with a finely-divided copper compound suspended in a high-boiling oil which is inert with respect to the oil vapors and the naphthenic acid, with resultant formation of cuprous naphthenate, and using the cuprous naphthenate thus formed as the source material of the copper naphthenate used in the treatment of further amounts of oil.

8. In the process of treating petroleum oil with a copper naphthenate for the fixation of sulfur compounds contained therein in which the copper naphthenate is introduced into the oil and the oil subsequently is subjected to heat treatment and the liberation of vapors containing naphthenic acid resulting from the decomposition of the copper naphthenate; the improvement which comprises passing liberated vapors containing the naphthenic acid into intimate contact with a finely-divided copper compound suspended in a gaseous medium which is inert with respect to the oil vapors and naphthenic acid contained in them with resultant formation of cuprous naphthenate, and using the cuprous naphthenate thus formed as the source material of the copper naphthenate used in the treatment of further amounts of oil.

9. In the process of treating petroleum oil with a copper naphthenate for the fixation of sulfur compounds contained therein in which the copper naphthenate is introduced into the oil and the oil subsequently is subjected to heat treatment and the liberation of vapors containing naphthenic acid resulting from the decomposition of the copper naphthenate; the improvement which comprises passing liberated vapors containing the naphthenic acid into intimate contact with a finely-divided copper compound suspended in a fluid medium which is inert with respect to the oil vapors and the naphthenic acid, at a temperature above about 225° C., with resultant formation of cuprous naphthenate, and using the cuprous naphthenate thus formed as the source material of the copper naphthenate used in the treatment of further amounts of oil.

10. In the process of treating petroleum oil with a copper soap of a water-insoluble organic acid for the fixation of sulfur compounds contained therein in which a copper soap is introduced into the oil and the oil subsequently is subjected to heat treatment with the liberation of vapors containing the water-insoluble organic acid resulting from decomposition of the copper soap and a copper product; the improvement which comprises passing the liberated vapors containing the water-insoluble organic acid into intimate contact with a finely-divided copper compound with resultant formation of the cuprous soap of the acid, using the cuprous soap thus formed as the source material of the copper soap used in the treatment of further amounts of petroleum oil, and converting the copper product to the desired copper compound for reaction with further amounts of water-insoluble organic acid contained in oil vapors.

11. In the process of treating petroleum oil with a copper soap of a water-insoluble organic acid for the fixation of sulfur compounds contained therein in which a copper soap is introduced into the oil and the oil subsequently is subjected to heat treatment with the liberation of vapors containing the water-insoluble organic acid resulting from decomposition of the copper soap and a copper product; the improvement which comprises passing the liberated vapors containing the water-insoluble organic acid into intimate contact with a finely-divided copper compound, at a temperature above about 225° C., with resultant formation of the cuprous soap of the acid, using the cuprous soap thus formed as the source material of the copper soap used in the treatment of further amounts of petroleum oil, and converting the copper product to the desired copper compound for reaction with further amounts of water-insoluble organic acid contained in oil vapors.

12. In the process of treating petroleum oil with a copper soap of a water-insoluble organic acid for the fixation of sulfur compounds contained therein in which a copper soap is introduced into the oil and the oil subsequently is subjected to heat treatment with the liberation of vapors containing the water-insoluble organic acid resulting from decomposition of the copper soap and a copper product; the improvement which comprises passing the liberated vapors containing the water-insoluble organic acid into intimate contact with a finely-divided copper compound suspended in a high-boiling oil which is inert with respect to the oil vapors and the water-insoluble organic acid, with resultant formation of the cuprous soap of the acid, using the cuprous soap thus formed as the source material of the copper soap used in the treatment of further amounts of petroleum oil, and converting the copper product to the desired copper compound for reaction with further amounts of water-insoluble organic acid contained in oil vapors.

13. In the process of treating petroleum oil with a copper soap of a water-insoluble organic acid for the fixation of sulfur compounds contained therein in which a copper soap is introduced into the oil and the oil subsequently is subjected to heat treatment with the liberation of vapors containing the water-insoluble organic acid resulting from decomposition of the copper soap and a copper product; the improvement which comprises passing the liberated vapors containing the water-insoluble organic acid into intimate contact with a finely-divided copper compound suspended in a gaseous medium which is inert with respect to the oil vapors and the water-insoluble organic acid, with resultant formation of the cuprous soap of the acid, using the cuprous soap thus formed as the source material of the copper soap used in the treatment of further amounts of petroleum oil, and converting the copper product to the desired copper compound for reaction with further amounts of water-insoluble organic acid contained in oil vapors.

14. In the process of treating petroleum oil with a copper naphthenate for the fixation of sulfur compounds contained therein in which a copper naphthenate is introduced into the oil and the oil subsequently is subjected to heat treatment with the liberation of vapors containing naphthenic acid resulting from the decomposition of the copper naphthenate and a copper product; the improvement which comprises passing liberated vapors containing the naphthenic acid into intimate contact with a finely-divided copper compound, with resultant formation of cuprous naphthenate, using the thus formed cuprous naphthenate as a source material of the copper naphthenate used in the treatment of further amounts of petroleum oil, and converting the copper product to the desired copper compound for reaction with further amounts of naphthenic acid.

15. In the process of treating petroleum oil with a copper naphthenate for the fixation of sulfur compounds contained therein in which a copper naphthenate is introduced into the oil and the oil subsequently is subjected to heat treatment with the liberation of vapors containing naphthenic acid resulting from the decomposition of the copper naphthenate and a copper product; the improvement which comprises passing liberated vapors containing the naphthenic acid into intimate contact with a finely-divided copper compound, at a temperature above about 225° C., with resultant formation of cuprous naphthenate, using the thus formed cuprous naphthenate as a source material of the copper naphthenate used in the treatment of further amounts of petroleum oil, and converting the copper product to the desired copper compound for reaction with further amounts of naphthenic acid.

16. In the process of treating petroleum oil with a copper naphthenate for the fixation of sulfur compounds contained therein in which a copper naphthenate is introduced into the oil and the oil subsequently is subjected to heat treatment with the liberation of vapors containing naphthenic acid resulting from the decomposition of the copper naphthenate and a copper product; the improvement which comprises passing liberated vapors containing the naphthenic acid into intimate contact with a finely-divided copper compound suspended in a high-boiling oil which is inert with respect to the oil vapors and the naphthenic acid, with resultant formation of cuprous naphthenate, using the thus formed cuprous naphthenate as a source material of the copper naphthenate used in the treatment of further amounts of petroleum oil, and converting the copper product to the desired copper compound for reaction with further amounts of naphthenic acid.

17. In the process of treating petroleum oil with a copper naphthenate for the fixation of sulfur compounds contained therein in which a copper naphthenate is introduced into the oil and the oil subsequently is subjected to heat treatment with the liberation of vapors containing naphthenic acid resulting from the decomposition of the copper naphthenate and a copper product; the improvement which comprises passing liberated vapors containing the naphthenic acid into intimate contact with a finely-divided copper compound suspended in a gaseous medium which is inert with respect to the oil vapors and the naphthenic acid, with resultant formation of cuprous naphthenate, using the thus formed cuprous naphthenate as a source material of the copper naphthenate used in the treatment of further amounts of petroleum oil, and converting the copper product to the desired copper compound for reaction with further amounts of naphthenic acid.

CHARLES O. HOOVER.

REFERENCES CITED

The following references are of record in the file of this patent:

UNITED STATES PATENTS

| Number | Name | Date |
|---|---|---|
| 2,071,862 | Fisher | Feb. 23, 1937 |
| 2,091,239 | Hall | Aug. 24, 1937 |
| 2,157,767 | Long | May 9, 1939 |
| 2,273,263 | Happel et al. | Feb. 17, 1942 |
| 2,395,307 | Weber et al. | Feb. 19, 1946 |